United States Patent [19]

Ellis

[11] 3,738,474

[45] June 12, 1973

[54] APPLE ORIENTOR

[75] Inventor: Robert G. Ellis, Richmond, Calif.

[73] Assignee: Atlas Pacific Engineering Company, Emeryville, Calif.

[22] Filed: Nov. 1, 1971

[21] Appl. No.: 194,206

Related U.S. Application Data

[63] Continuation-in-part of Ser. No. 38,402, May 18, 1970, abandoned.

[52] U.S. Cl. .................. 198/33 AA, 146/52

[51] Int. Cl. .................. B65g 47/24

[58] Field of Search .................. 198/33 AA, 33 R; 146/52, 224; 51/236

[56] References Cited

UNITED STATES PATENTS

| | | | |
|---|---|---|---|
| 3,563,362 | 2/1971 | Tomelleri | 198/33 R |
| 2,946,361 | 7/1960 | Skog et al. | 146/52 X |
| 3,225,892 | 12/1965 | Keesling | 198/33 R |

*Primary Examiner*—Evon C. Blunk
*Assistant Examiner*—Hadd S. Lane
*Attorney*—Robert H. Eckhoff, Carl Hoppe and Robert G. Slick et al.

[57] ABSTRACT

This invention relates to an improved device for orienting apples, particularly those known as the Red Delicious variety and which may be relatively long as compared to their diameter. The device is also capable of orienting apples having attached stems. The device is particularly suited to orienting apples fed from a bulk supply and which are largely ungraded as to size. Such apples can vary in size from a diameter of about 2¼ inches to 4½ inches.

8 Claims, 7 Drawing Figures

16 61 62 50 14 66 39 41 68 67 69

INVENTOR.
ROBERT G. ELLIS
BY
[signature]
ATTORNEYS

INVENTOR.
ROBERT G. ELLIS
BY Ecenoff and Hoppe
ATTORNEYS

APPLE ORIENTOR

CROSS-REFERENCE TO RELATED APPLICATIONS

This application is a continuation-in-part of application, Ser. No. 038 402, filed May 18, 1970, entitled Apple Orientor, now abandoned.

BACKGROUND OF THE INVENTION

There has recently been introduced a machine in which apples are picked from a bulk supply and are fed continuously in single file order one at a time to the first of two orientors, the primary orientor (see U.S. Pat. No. 3 586 081). In the primary orientor, each apple is positioned with one of the two indents down and with its outer surface generally centered. The upper indent may or may not be in vertical alignment with the lower indent. The semi-oriented apples are then engaged by mechanism which engages both indents of the apple to refine the vertical alignment of the indents. Thereafter each properly oriented apple is moved into a peeling and coring mechanism wherein the skin and the core are removed and the indents are trimmed. Apples which are not fully oriented during the pickup are rejected before entering the peeling and coring sections.

The primary orientor basically includes a series of frusto-conical recesses provided about the periphery of a plate. Adjacent the open bottom of each receptacle a rotating wheel extends upwardly over a portion of the travel of the plate to engage and rotate an apple until it comes to rest with either indent of the apple encompassing the wheel and the apple resting on the frusto-conical side wall of the receptacle. This device works quite satisfactorily with apples which are generally round or flat in shape. But some apples do not conform to such shapes. For example, many of the Red Delicious variety of apple are elongated and the previously described device is not too effective in orienting such apples. Apples having long protruding stems frequently could not be rotated into the oriented position because the stem would hang up on the frusto-conical surface of the cup.

SUMMARY OF THE INVENTION

In accordance with the present invention, I have provided an improved apple orientor device which is capable of orienting apples which have a normal apple shape as well as apples having the elongated shape of the Red Delicious variety; the apples may be with or without protruding stems.

In general, it is a broad object of this invention to provide an improved apple orienting device.

A further object of the invention is to provide an apple orienting device in which apples having protruding stiff stems can be successfully oriented.

A further object of the present invention is to provide an apple orienting device in which the inclined frusto-conical side wall of a receptacle includes one or more wheels projecting above the plane of the surface of the side wall and supporting the apple for easier rotation above the side wall, each of such wheels being positioned within the vertical projected area of a fruit in the receptacle.

An additional object of the present invention is to provide relief in the frusto-conical side wall so that the stem of an apple does not engage and hang up on the frusto-conical side wall

DESCRIPTION OF THE PREFERRED EMBODIMENT

Figure 1:
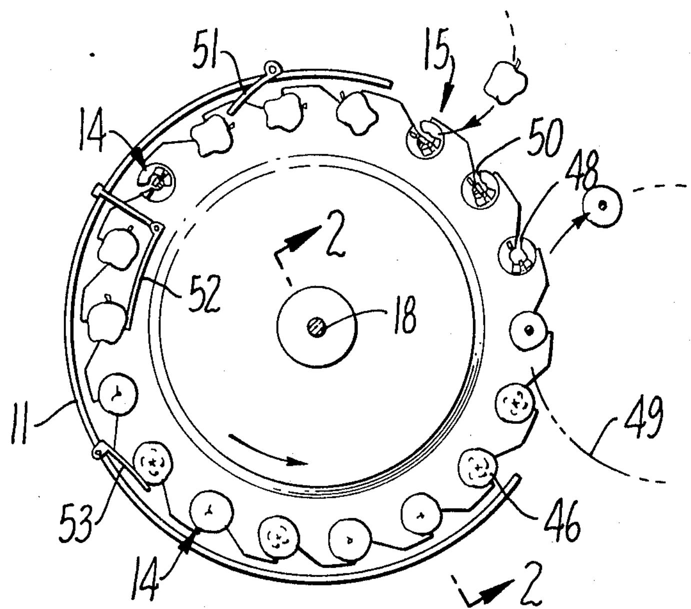
FIG. 1 is a plan view showing the orienting plate and the plurality of receptacles.
Figure 2:
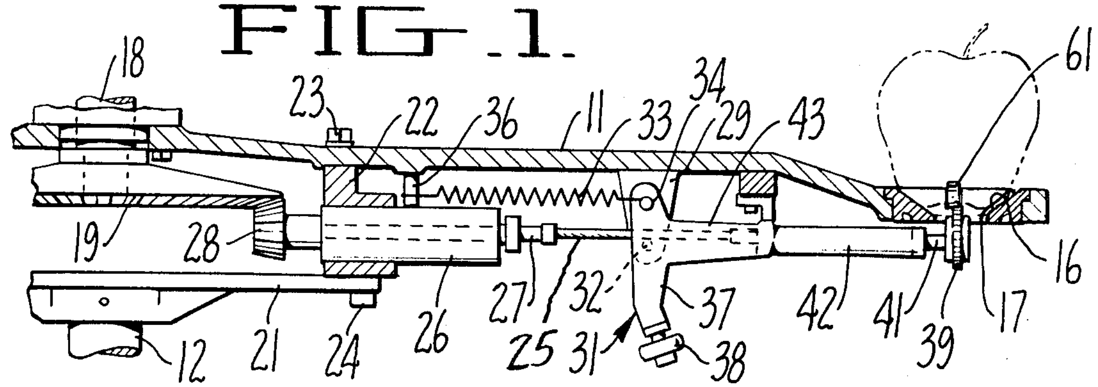
FIG. 2 is a section taken along the lines 2—2 in FIG. 1.

Referring particularly to FIGS. 1 and 2, a circular plate 11 is mounted for rotation by a central shaft 12. The plate includes a plurality of receptacles, each generally indicated at 14, and each of which includes a frusto-conical side wall 16 and an open bottom 17. Apples are fed onto the plate at the feeding station, illustrated diagrammatically at 15, as the plate turns in a counterclockwise direction.

Mounted centrally on the plate 11 is a shaft 18 carrying a bevel gear 19. A circular plate 21 is provdided upon the upper end of shaft 12 and a ring 22, attached to plate 11 and plate 21 by bolts 23 and 24, supports plate 11 for rotation with shaft 12. At each location of a receptacle 14, a sleeve 26 supports a shaft 27, each shaft 27 having a pinion gear 28 thereon enmeshed with the bevel gear 19 and rotated thereby. Midway of plate 11 and again adjacent each receptacle, a plurality of depending ears 29 are provided. A three arm yoke-like level 31 is mounted on pins 32 on each pair of ears 29. A spring 33 is provided between arm 34 of the lever 31 and a pin 36 depending from the plate 11 to bias the bell crank in the position shown in FIG. 2. Arm 37 of the lever 31 includes a roller 38 which engages a cam track (not shown), the cam track being effective to move the lever downwardly so that wheel 39 on end of shaft 41 is moved out of orienting position. The wheel is preferably mounted off-center on shaft 41 so that it wobbles in effect as it rotates in a clockwise direction when observed from the free end of shaft 41, the shaft 41 being connected by a flexible cable 25 to the rotating shaft 27. The periphery of the wheel is knurled as at 40. Shaft 41 is secured in a bearing 42 which extends from the third arm 43 of the lever 31. Each wheel is moved out of position between the locations indicated at 46 and 48 in FIG. 1 by the cam track so that an oriented apple can be picked up by suitable pickup mechanism which moves over a circular path indicated at 49 and which refines vertical alignment of the indents.

Provided about the periphery of the plate 11 are several spring biased fingers 51, 52 and 53. These engage an apple which is not oriented in the frusto-conical receptacle so that the apple is moved into a different engagement with the associated rotating wheel 39.

As I have previously mentioned, the orienting device so far describedis quite successful in orienting apples which have a normal apple shape but it is not successful in handling apples such as the Red Delicious variety which are relatively elongated and may even have a rounded corner quadrilateral cross section. Generally the blossom end will have five bumps which may grossly distort the quadrilateral shape at the blossom end. Further, the device described so far is not successful in handling apples which have protruding stiff stems.

Figure 3:
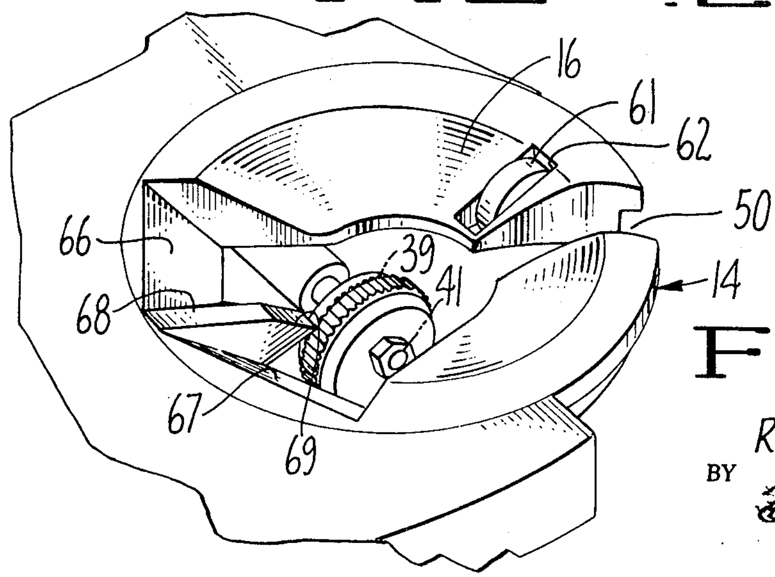
FIG. 3 is a perspective view showing one of the receptacles including the orienting means of the present invention.

In accordance with the presentinvention, I provide a second wheel 61, this wheel being supported in a recess 62 provided in the receptacle side wall and supported therein for free rotation by a shaft 63. The wheel 61 is adjustably mounted so that the periphery of the wheel extends above the side wall of the receptacle by a suitable amount as appears in FIGS. 3 and 5. The passed 61 is mounted substantially on the central vertical plane pased through the wheel 39 and closely adjacent to an arcuate opening 50 provided in the receptacle 14. Further, and in accordance with this invention, the upper surface of the wheel 61 is closely adjacent to but below the upper surface of the frusto-conical side wall 16 and within the vertical projected area of the fruit. By the term "vertical projected area of the fruit," I mean that area which would appear in shadow on a horizontal plane immediately below the apple when the apple was illuminated by a light providing illumination normal to the horizontal plane. This enables the wheel 61 to provide support for any apple fed to the device and which is in the usual broad size range of apples processed commercially.

An unoriented apple in a receptacle rests on wheels 39, 61 and on a third point on the frusto-conical surface of the receptacle. As the wheel 39 rotates clockwise toward wheel 61 as viewed in FIG. 5, the apple rotates counterclockwise and shifts position so that a large portion of its weight is borne by wheel 61. Thus, even elongated apples are well supported in a manner effective to let them be turned easily by wheel 39.

Figure 4:
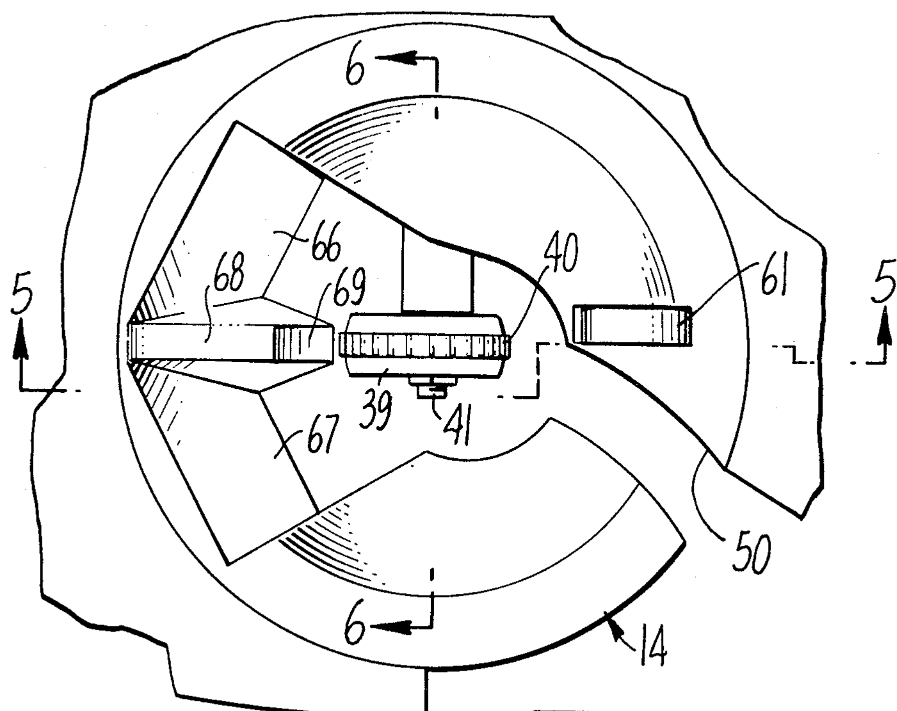
FIG. 4 is a plan view of the orienting device shown in FIG. 3.
Figure 5:
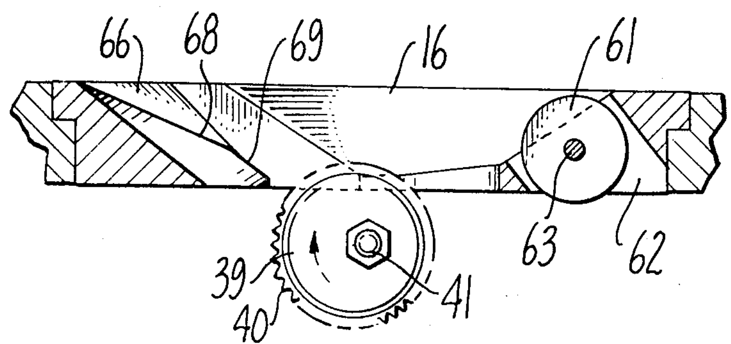
FIGS. 5 and 6 are, respectively, sections taken along the lines 5—5 and 6—6 in FIG. 4.
Figure 6:
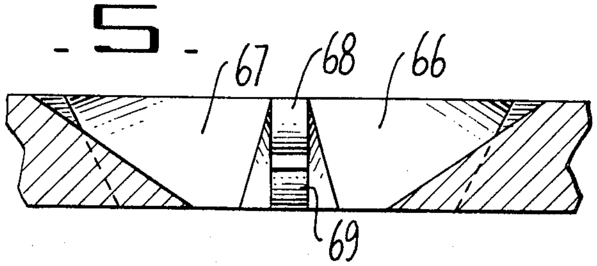

To facilitate handling of unoriented apples having stiff protruding stems and which would be rotating counterclockwise in FIG. 5, slots 66 and 67 are preferably cut in the frusto-conical side wall, thus providing a passageway for the stemthrough the side wall so t the stem indent could be located downwards. The slots that separated by a portion 68 of the side wall which is immediately opposite the wheel 61 and has a surface 69 which is a portion of the original frusto-conical surface and acts as a support for the apple when an indent has been found, other supports being points on the frusto-conical surface. As is apparent from FIGS. 4 and 7, the slots 66 and 67 are both on the same side of a vertical plane perpendicular to the vertical plane in which wheel 39 rotates and bisecting the shaft 41 and on opposite sides of the vertical plane in which wheel 61 rotates. Also, the walls of the slots that are remote from the supporting surface portion 69 of the frusto-conical side walls are at an acute angle to one another.

Figure 7:
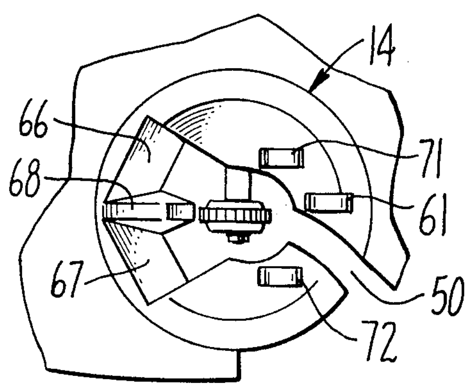
FIG. 7 is a plan view of a modification of the orienting device of this invention.

In the modification shown in FIG. 7, I have provided additional wheels 71 and 72 on either side of wheel 61, these being similarly supported and provide additional low friction contact points for the rolling unoriented apple.

The structure described herein provides means which enable the wheel 39 to turn an apple readily because of the minimizing of the vrictional contact of the apple with the frusto-conical side wall of the receptacle. When finally oriented, one indented endor the other of the apple will be over the wheel 39 out of contact with it.

I claim:

1. An apple orientor comprising: frictional end or
a. a support,
b. at least one receptacle in said support having an open bottom and a frusto-conical side wall,
c. a first wheel supported for rotation in a vertical plane in said open bottom to rotate an unoriented apple positioned in said receptacle,
d. at least additional wheel supported on said receptacle for free rotation in a vertical plane with the periphery of said wheel extending above the frusto-conical side wall, the vertical plane of the second wheel substantially coinciding with said first vertical plane,
e. and means for rotating the first wheel toward the second wheel, the first and second wheels projecting above the plane of the inclined surface of said frusto-conical wall sufficiently to engage an apple supported in said receptacle and within the vertical projected area of an apple in said receptacle, so that an apple will be engaged by said wheels within the vertical projected area thereof.

2. An apple orientor as in claim 1 wherein a pair of spaced slots are provided in the frusto-conical wall on opposite sides of the vertical plane in which the second wheel rotates.

3. An apple orientor as in claim 1 wherein a pair of additional wheels are each supported for rotation on said receptacle, adjacent to and substantially parallel with said first wheel, said wheels extending above the frusto-conical side wall.

4. An apple orientor comprising:
a. a support,
b. at least one receptacle in said supporchaving an open bottom and a frusto-conical side wall,
c. a first wheel supported for rotation in a first vertical plane in said open bottom to rotate an unoriented apple positioned in said receptacle,
d. a second wheel supported by said support for free rotation in a second vertical plane which is substantially parallel and closely adjacent to the first vertical plane with the periphery of said wheel extending above the frusto-conical side wall and within the vertical projected area of an apple in said receptacle,
e. means for rotating the first wheel toward the second wheel,
f. and a pair of spaced slots in the frusto-conical side wall on opposite sides of the vertical plane in which the second wheel rotates.

5. An apple orientor comprising:
a. a support,
b. at least one receptacle in said support having an open bottom and a frusto-conical side wall,
c. a wheel supported on an axis for rotation in a vertical plane in said open bottom to rotate an unoriented apple positioned in said receptacle,
d. means for rotating the wheel,
e. a pair of spaced slots in the frusto-conical side wall on opposite sides of the vertical plane in which the wheel rotates,
f. and said slots being separated by a fruit supporting portion of said frusto-conical side wall.

6. An apple orientor as in claim 5 wherein the periphery of the wheel is knurled.

7. An apple orientor as in claim 5 wherein both slots are on the same side of a vertical plane perpendicular to the vertical plane in which the wheel rotates and bisecting the axis of said wheel.

8. An apple orientor as in claim 5 wherein said slots have opposite side walls and the respective side walls that are remote from said fruit supporting portion of said frusto-conical side wall are at an acute angle to one another.

* * * * *